United States Patent

Fennel et al.

[11] Patent Number: 4,657,313
[45] Date of Patent: Apr. 14, 1987

[54] SLIP-CONTROLLED BRAKE SYSTEM FOR ROAD VEHICLES

[75] Inventors: Helmut Fennel, Bad Soden; Ivica Batistic, Frankfurt am Main, both of Fed. Rep. of Germany

[73] Assignee: Alfred Teves GmbH, Frankfurt am Main, Fed. Rep. of Germany

[21] Appl. No.: 722,708

[22] Filed: Apr. 12, 1985

[30] Foreign Application Priority Data

Apr. 12, 1984 [DE] Fed. Rep. of Germany ....... 3413738

[51] Int. Cl.$^4$ ........................... B60T 8/84; B60T 8/76
[52] U.S. Cl. ...................................... 303/96; 303/100; 303/111
[58] Field of Search ................. 303/96, 100, 111, 110, 303/109, 106; 180/197; 188/181 C, 181 A

[56] References Cited

U.S. PATENT DOCUMENTS

| | | | |
|---|---|---|---|
| 3,535,004 | 10/1970 | Howard et al. | 303/96 |
| 3,797,892 | 3/1974 | Leiber | 303/106 |
| 3,888,549 | 6/1975 | Grosseau | 303/96 |
| 4,451,096 | 5/1984 | Gygay | 303/109 |

FOREIGN PATENT DOCUMENTS

| | | | |
|---|---|---|---|
| 0051801 | 5/1982 | European Pat. Off. | |
| 1500056 | 2/1978 | United Kingdom | 303/111 |

Primary Examiner—Douglas C. Butler
Assistant Examiner—Alvin Oberley
Attorney, Agent, or Firm—James B. Raden; William J. Michals

[57] ABSTRACT

A slip-controlled brake system for road vehicles in which one front wheel (VR, VL) and one rear wheel (HR, HL) at a time are connected to a common braking pressure control channel wherein the braking pressure variation in the two braking pressure control channels is influenced in dependence on predetermined selection criteria such as "select-low" and "select-high" criteria. A cornering identification circuit (20') is provided which adds up the slip values ($S_{VL}$, $S_{HL}$, $S_{VR}$, $S_{HR}$) of the two wheels on one side of the vehicle and compares themn with the slip value sum ($S_L$, $S_R$) of the wheels of the other side of the vehicle. When the difference of the slip value sums of the two sides of the vehicle exceeds a limit value, the selection criteria and, hence, the braking pressure variations are temporarily changed. Because of the cornering identification circuit, it is possible to generate information about the driving direction, i.e. about straight-onward driving or cornering, and to logically process it within the scope of brake slip control or traction slip control and irrespective of the number of existing braking pressure control channels.

7 Claims, 2 Drawing Figures

SLIP-CONTROLLED BRAKE SYSTEM FOR ROAD VEHICLES

BACKGROUND OF THE INVENTION

This invention relates to a slip-controlled brake system provided for road vehicles where one front wheel and one rear wheel at a time are connected to a common braking pressure control channel and where the individual wheels are equipped with sensors for the detection of the rotational behavior of the wheels. Braking pressure modulators are controllable by the signals of the sensors after the handling, logical combination, and processing of the signals, with the rotational behavior of the individual wheels influencing the braking pressure variation in the braking pressure control channels as a function of predetermined selection criteria such as "select-low" and "select-high" criteria and on additional conditions, in particular on limit values. This invention further relates to brake systems in general which are equipped with braking pressure modulators, by means of which the braking pressure at the individual wheels may be varied individually or in groups, and which have wheel sensors. The braking pressure modulators are controllable by the signals of said sensors after the handling, logical combination, and processing of said signals by means of electric circuits comprising a cornering identification circuit.

For the sake of simplifying slip-controlled brake systems and for the sake of rendering them cheaper known systems provide but one or two braking pressure control channels instead of individual control of all wheels. In order to nevertheless avoid lock-up of the wheels connected to one common channel according to the "select-low" principle the wheel with the strongest deceleration is used for governing the braking pressure. In so doing, and with respect to the second wheel controlled along with the first one, one does not utilize the adhesive value to the maximum extent possible. As a result thereof the length of the necessary stopping distance may increase. If, on the other side, slip control depends on the "select-high" principle (i.e., on the faster wheel or rather on the wheel decelerated less) in many cases it is impossible to avoid excessive slip or even a lock-up of the wheel controlled along with the first one.

It is also known to abandon a fixed coordination of the wheels with a certain control group governed either by the "select-low" principle or by the "select-high" principle. Instead, in a known anti-skid system (European Patent=E.P.-A-51801) at first one determines which wheel has the worst road surface contact, ignoring its rotational behavior and controlling all the other wheels jointly according to the "select-low" criterium. In the case of a dual-circuit brake sytem with diagonal split-up, in this known system the circuit with the wheel, which is the first to become unstable, is switched to "select-high" control, the other circuit being switched to "select-low" control. This method is disadvantageous in that in some situations (e.g., when changing lanes or in a bend) there may result excessive debraking. It is therefore an object of this invention to overcome the mentioned disadvantages of the known brake systems and to provide a slip-controlled brake system which despite the limitation to two braking pressure control channels ensures a safe braking action with a short stopping distance even in unfavorable situations and in particular when braking in a bend or when changing lanes.

Generally, this invention adapts the controlled braking pressure variation to the varying conditions and physical factors of straight-onward driving and of cornering such as to maintain the driving stability and steerability as far as possible in all situations.

SUMMARY OF THE INVENTION

This object achieved in a brake system of the type referred to above, where one front wheel and one rear wheel at a time are connected to a common braking pressure control channel. A cornering identification circuit is inserted which adds up the slip values of the wheels of one side of the vehicle, comparing them with the slip value sum of the wheels on the other side of the vehicle, and which temporarily effects a change of the selection criteria and/or of the additional conditions—as soon as the difference of the slip value sums of the two sides of the vehicle exceeds a predetermined value—and thus of the braking pressure variation in the braking pressure control channels as a function of the rotational behavior of the wheels.

In principle, according to the present invention, the aforementioned object is achieved by a slip-controlled brake system equipped with electronic circuits and cornering identification circuits where, independently of the number of existing control channels, the cornering identification circuit adds up the slip values of the wheels of one side of the vehicle, comparing them with the slip value sum of the wheels of the other side of the vehicle and generating a cornering identification signal as soon as the difference of the slip value sums exceeds a predetermined limit value. Both in brake slip control and in traction slip control with such a brake system, it is possible to overcome the difficulties caused by the different behavior of the vehicle when driving straight or when cornering.

This invention thus is based on the principle that by summing up the wheel slip of each side of the vehicle and by comparing the sums it is possible to definitely and reliably determine whether the vehicle is driving straight or cornering at a given moment. Because of the cornering identification circuit, it is possible to reliably avoid weak braking action by switching-over the selection criteria or rather by adapting the braking pressure control to the particular conditions of cornering. Thus the driving stability is maintained and it is possible to achieve a sufficiently controlled slowing-down with a short stopping distance.

According to an advantageous embodiment of this invention, during straight-onward driving, braking pressure control in one of the two braking pressure control channels depends on the wheel associated with this circuit and having worse contact with the road surface ("select-low" principle) or rather on the wheel decelerated more while braking pressure control in the other braking pressure control circuit depends on the wheel with a better contact with the road surface ("select-high" principle)—as long as the slip of the rear wheel connected to this circuit does not exceed a predetermined limit value. In cornering, i.e. upon a response of the cornering identification circuit, however, the front wheels govern pressure control in both braking pressure control channels.

If, during straight-onward driving, the slip of the circuit controlled according to the "select-high" principle exceeds a predetermined limit value, then this circuit will be switched over to "select-low" control. In some cases it will be of particular advantage to connect the diagonal vehicle wheels to a common braking pressure control channel at a time.

BRIEF DESCRIPTION OF THE DRAWING

Further characteristics, advantages, and applications of the present invention will become evident from the following description of an embodiment, reference being made to the accompanying drawing wherein.

DETAILED DESCRIPTION

Figure 1:
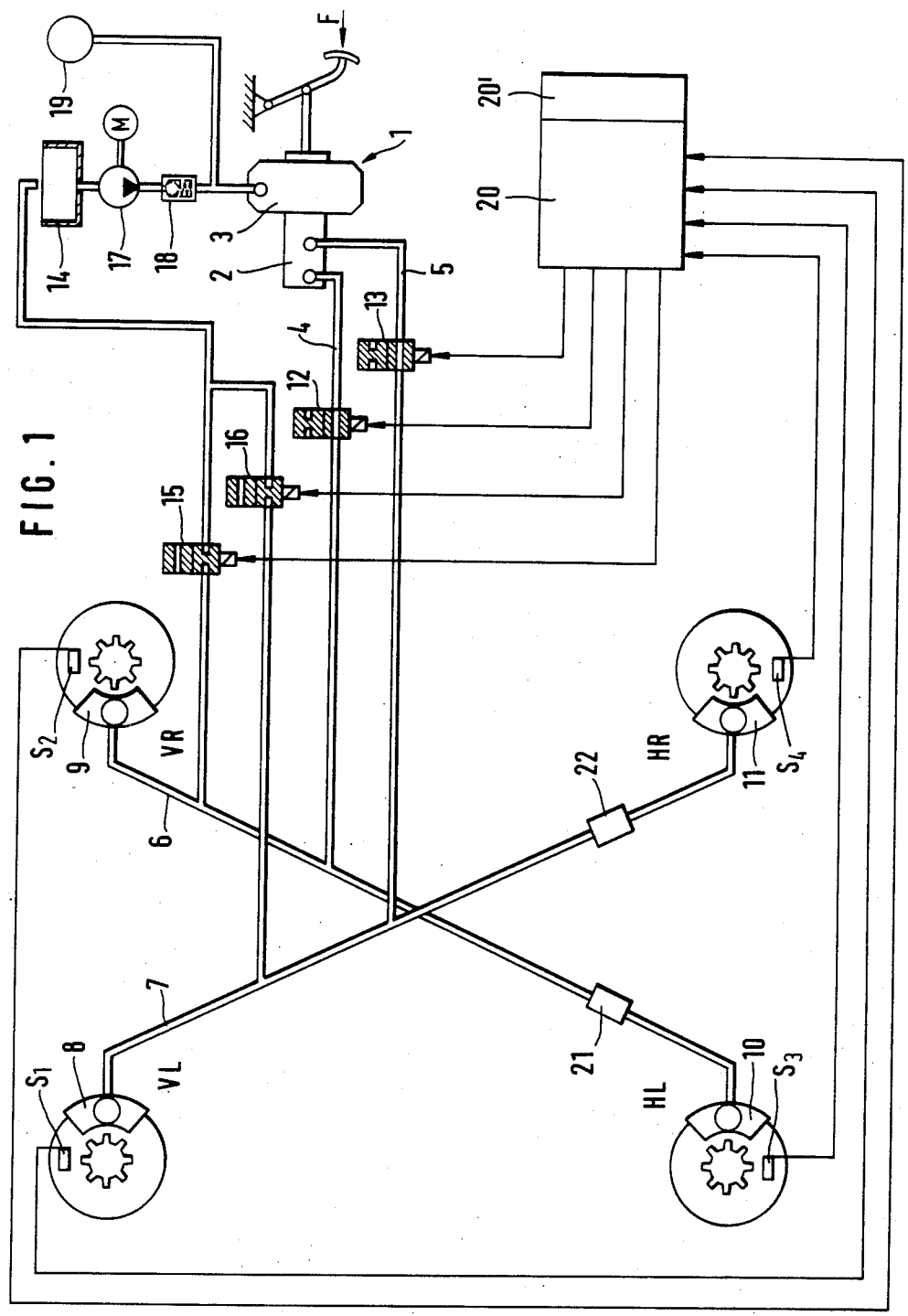
FIG. 1 is a schematically simplified representation of the principle of a dual-circuit brake system of the inventive type where one front wheel and one rear wheel at a time are connected to a common braking pressure control channel; and, FIG. 2 is the connection diagram of a cornering identification circuit used e.g. for the brake system according to FIG. 1.

According to FIG. 1, the brake system consists of a braking pressure generator 1 which, e.g., is composed of a tandem master cylinder 2 and of a hydraulic brake booster 3. By way of hydraulic connecting lines 4, 5 and by way of the diagonal connection lines 6, 7 the wheel brakes 8 through 11 of the front wheels VL, VR and of the real wheels HL, HR are connected to said braking pressure generator 1. This brake system, thus, is a dual-circuit brake system with diagonal split-up. Inserted into the pressure medium path leading to the wheel brakes 8 through 11 of the front and rear wheels are electromagnetically operable 2/2-way valves 12, 13 which are open in the represented rest position. In the return path from the wheel cylinders to a pressure compensation reservoir 14, a likewise electromagnetically operable 2/2-way valve 15, 16 is inserted into each diagonal line 6, 7, said 2/2-way valves 15, 16 being locked in the rest position.

The illustrated brake system has an electric-motor-driven pump 17 with the associated non-return valve 18 and with a hydraulic pressure accumulator 19 for hydraulic energy supply.

Besides, all the vehicle wheels VL, VR, HL, HR of this system are equipped with inductive sensors S1 through S4. By way of the signal lines or rather connection lines shown in the drawing, said sensors S1 through S4 feed information about the rotational behavior of the wheels into an electronic circuit 20 in which the sensor signals are handled, logically combined, and processed and which, finally, generates output signals for the operation of the 2/2-way valves 12, 13, 15, 16. The circuit 20 may be realized by a prewired or by a program-controlled electronic circuit with the appertaining peripheral units such as power supply, control, etc.

Finally, in the embodiment represented here, pressure reducers 21, 22 are inserted into the hydraulic path from the braking pressure generator 1 to the rear wheel brakes 10, 11. By means of said pressure reducers 21, 22 it is possible to influence the braking force distribution to the front and rear axles in the known manner for the purpose of compensating dynamic axle load shifts.

Slip control is possible by means of the 2/2-way valves 12, 13, 15, 16 in the manner known in that in one or in both hydraulic circuits, because of the switching over of the valves 12, 13, the pressure may be kept constant, independently of the pedal force F, or may be reduced because of the switching over of the valves 15, 16 in the return path to the pressure compensation reservoir 14.

According to this invention, in addition, the brake system is equipped with a cornering identification circuit symbolized by part 20' of the electronic circuit 20 in FIG. 1. Definite evidence as to whether the vehicle is driving straight on or whether it is cornering at a particular moment may be attained according to this invention in that by means of the circuit 20' the momentary slip values of the left wheels VL, HL, on the one hand, and of the right wheels VR, HR, on the other hand, are added up and in that the sums are compared with each other.

Figure 2:
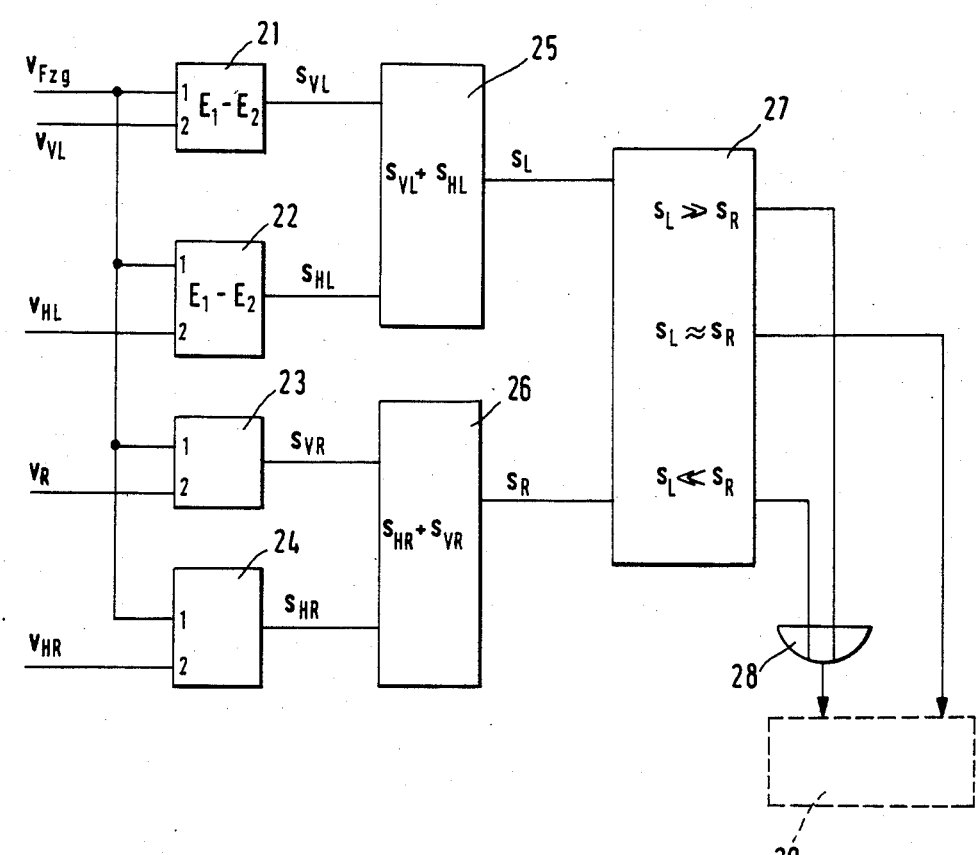

FIG. 2 shows the principles of the design of the circuit 20' or rather of the corresponding logic. In the stages 21, 22, 23, and 24, respectively, the vehicular velocity or a reference value $v_{Fzg}$ is compared with the velocity of a wheel $v_{VL}$, $v_{HL}$, $v_{VR}$, and $v_{HR}$. And each time the difference is computed between the vehicular velocity and the velocity of the wheel whence a value is gathered which is proportional to the slip of the individual wheels. In the following stages 25 and 26, the slip values $S_{VL}$ and $S_{HL}$, on the one hand, as well as $S_{VR}$ and $S_{HR}$, on the other hand, are added up. The slip value sum $S_L$ of the left wheels is compared with the slip value sum $S_R$ of the right wheels in a stage 27.

If the slip of the two sides of the vehicle is approximately the same, the logic 20' concludes that the vehicle is driving straight on. However, if the slip of the left or of the right side considerably exceeds the slip of the opposite side, the logic 20 receives corresponding information by way of an OR-gate 28. Said information will imply a change in the selection criteria. In this system, in particular, it will cause the front wheels VR, VL to govern the braking pressure variation. What is now shown in FIG. 2 is that the cornering identification circuit, however, will not respond before the slip difference exceeds a predetermined minimum or limit value.

By means of the OR-gate 28, allowance is made for the fact that no information is required about the direction of the cornering since the front wheels are meant to govern the braking pressure control both in rightward and in leftward cornering.

The mode of operation of the inventive brake system will be described in the following, reference being made to a motor car with diagonal split-up of the brake circuits and control channels.

When driving straight on, overbraking of the rear wheels which would be dangerous to the directional stability or rather to the driving stability of the vehicle is prevented in that one of the braking pressure control channels is set to be in "select-low" mode, the other being set to be in "select-high" mode; this, however, under the additional condition that there is a switching-over to front-wheel-governed pressure control as soon as a rear wheel slip limit value is reached.

Even with road conditions varying greatly, braking pressure control according to the aforementioned criteria proves to be very advantageous when the vehicle is driving straight on. When braking in a bend, however, under unfavorable conditions, excessive braking pressure reduction and hence an undesired increase in the length of the stopping distance might be the result. The rear wheel on the inside of the bend, which in this situation is loaded to but a small degree and which tends to lock prematurely, would namely lead to a relatively weak pressure at the front wheel on the outside of the bend, which belongs to the same control circuit, although in this situation said front wheel on the outside of the bend is loaded most. Under unfavorable conditions the result would be excessive debraking due to slip control.

According to this invention, however, by summing up the slip values of each side of the vehicle and by comparing the slip value sums of each vehicle side, it is definitely recognized that the vehicle is cornering. Consequently, control will depennd on other selection criteria as compared with the case of straight-onward driving. The comparison of the slip value sums in this situation, i.e. during cornering, will imply the decision of the control logic to have the braking pressure variation in both diagonals governed by the front wheels, only. Thereby, at the front wheel on the outside of the bend, which is loaded most, there will result the greatest value of adherence possible even if the rear wheel on the inside of the bend would be overbraked by the respective braking pressure required and might lock. The rear wheel on the outside of the bend, which is governed by the front wheel on the inside of the bend, which front wheel is relieved during cornering, consequently receives a braking pressure rated such as to ensure that said rear wheel most probably will not lock. Thus, it also contributes greatly to the lateral direction of the vehicle. Consequently, the lateral stability will be maintained even if the rear wheel on the inside of the bend is locking.

Altogether, the inventive brake system allows the achievement of a particularly short stopping distance and of a great degree of driving stability when braking in a bend. The selection criteria and the additional conditions with regard to braking during straight-onward driving may be selected independently of the particular conditions of cornering.

By summing up the slip values according to this invention, by comparing the slip value sum with that of the opposite side, and by evaluating this information, it is not only possible to considerably improve the brake system described above as embodiment and equipped with two controlled hydraulic circuits, but—irrespective of the number of existing hydraulic circuits and braking pressure control circuits—it is also possible in general to overcome the difficulties of brake slip control or of traction slip control which are caused by the different behavior of the vehicle in cornering and during straight-onward driving. E.g., in dependence on the output signal of the cornering identification circuit, it is possible to vary the gradient by means of which the reference velocity of the vehicle is reduced or increased in the respective control phase. By means of integration over sufficiently long periods, if necessary, it is possible to eliminate the influence of different friction values on the vehicle sides.

What is claimed is:

1. A slip-controlled brake system for road vehicles where one front wheel and one rear wheel are respectively connected to each of two common braking pressure control channels and where the individual wheels are equipped with sensors for the detection of the rotational behavior of the wheels, including braking pressure modulators for varying braking pressure and controllable by the signals of said sensors after the handling, logical combination, and processing of said signals by electronic circuits, with the rotational behavior of the individual wheels influencing the braking pressure variation in the braking pressure control channels as a function of predetermined selection criteria the selection criteria being "select-low" and "select-high" criteria and on predetermined slip limit values, wherein a cornering identification (20') is provided which calculates slip limit values of the individual wheels and adds up the slip values ($S_{VL}$, $S_{HL}$, $S_{VR}$, $S_{HR}$) of the wheels of one side of the vehicle (respectively VR, HR or VL, HL), comparing them with the slip value sum ($S_R$ or $S_L$, respectively) of the wheels of the other side of the vehicle, and which temporarily effects a change of the selection criteria when the difference of the slip value sums ($S_R - S_L$) of the two sides of the vehicle exceeds a predetermined limit value and thereby effecting the braking pressure variation in the braking pressure control channels as a function of the rotational behavior of the wheels.

2. A brake system as claimed in claim 1, wherein during straight-onward driving, the braking pressure control in one of the two braking pressure control channels depends on the wheel associated with this channel and having worse contact with the road surface ("select-low" principle) while braking pressure control in the other braking pressure control channel depends on the wheel with a better contact with the road surface ("select-high" principle) when the slip of the rear wheel connected to this channel does not exceed a predetermined slip limit value, and wherein in cornering and in response to the cornering identification circuit (20'), the front wheels (VR, VL) govern pressure control in both braking pressure control channels.

3. A brake system as claimed in claim 2, wherein the straight-onward driving, the braking pressure control in the braking pressure control channel, which depends on the wheel with the better contact with the road surface, is governed by the front wheel when the slip at said rear wheel exceeds the predetermined slip limit value.

4. A device as claimed in claim 1, wherein the wheels (VR, HL or VL, HR, respectively) of one diagonal (6, 7) are connected to one braking pressure control channel.

5. A slip-controlled brake system for road vehicles, which system is equipped with braking pressure modulators, by means of which the braking pressure at the individual wheels may be varied, and which system has sensors for the detection of the rotational behavior of the individual wheels, the braking pressure modulators being controllable by the signals of said sensors after the handling, logical combination, and processing of said signals by means of electronic circuits comprising a cornering identification circuit, wherein the cornering identification circuit calculates the slip values of the individual wheels and adds up the slip values of the wheels (VR, HR or VL, HL, respectively) of one side of the vehicle, comparing them with the slip value sum ($S_R$, $S_L$) of the wheels on the other side of the vehicle and generating a cornering identification signal as soon as the difference of the slip value sums ($S_R - S_L$) of the two sides of the vehicle exceeds a predetermined limit value.

6. A brake system as claimed in claim 5, wherein at least two wheels are connected to a common braking pressure control channel and in that the pressure variation in the braking pressure control channels is controllable by said modulators in accordance with predetermined selection criteria the selection criteria being "select-low" and "select-high" criteria and predetermined slip limit values and the selection criteria and slip limit values may be varied in dependence on the output signal of the cornering identification circuit (20').

7. A brake system as claimed in claim 6, wherein the system is designed as one of a brake slip control system and a traction slip control system.

* * * * *